United States Patent
Brutzkus et al.

(10) Patent No.: US 10,412,107 B2
(45) Date of Patent: Sep. 10, 2019

(54) DETECTING DOMAIN NAME SYSTEM (DNS) TUNNELING BASED ON DNS LOGS AND NETWORK DATA

(71) Applicant: Microsoft Technology Licensing, LLC, Redmond, WA (US)

(72) Inventors: Alon Brutzkus, Herzliya (IL); Roy Levin, Yakov (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 15/466,300

(22) Filed: Mar. 22, 2017

(65) Prior Publication Data
US 2018/0278633 A1  Sep. 27, 2018

(51) Int. Cl.
| | | |
|---|---|---|
| H04L 9/00 | (2006.01) | |
| H04L 29/06 | (2006.01) | |
| H04L 29/12 | (2006.01) | |
| H04L 12/46 | (2006.01) | |
| H04L 12/26 | (2006.01) | |

(52) U.S. Cl.
CPC ...... *H04L 63/1425* (2013.01); *H04L 12/4633* (2013.01); *H04L 43/16* (2013.01); *H04L 61/1511* (2013.01); *H04L 61/2007* (2013.01); *H04L 63/1466* (2013.01); *H04L 63/0272* (2013.01)

(58) Field of Classification Search
CPC ............ H04L 63/1425; H04L 63/1466; H04L 61/1511; H04L 61/2007; H04L 12/4633
See application file for complete search history.

(56) References Cited

U.S. PATENT DOCUMENTS

| | | | |
|---|---|---|---|
| 9,003,518 B2 | 4/2015 | Wyschogrod et al. | |
| 2012/0054860 A1* | 3/2012 | Wyschogrod ..... | H04L 29/12066 726/22 |
| 2013/0014253 A1 | 1/2013 | Neou et al. | |

(Continued)

FOREIGN PATENT DOCUMENTS

| | | |
|---|---|---|
| CN | 103326894 A | 9/2013 |
| CN | 102624706 B | 7/2015 |

OTHER PUBLICATIONS

Born, et al., "Detecting DNS Tunnels Using Character Frequency Analysis", Retrieved from https://arxiv.org/ftp/arxiv/papers/1004/1004.4358.pdf, Apr. 25, 2010, 12 Pages.

(Continued)

*Primary Examiner* — Beemnet W Dada
(74) *Attorney, Agent, or Firm* — Workman Nydegger

(57) ABSTRACT

A system to detect domain name server tunneling includes a processor and machine readable instructions stored on a tangible machine readable medium, which when executed by the processor, configure the processor to collect, during a predetermined time period, responses received from a domain name server to queries sent to the domain name server by a computing device, the responses including internet protocol (IP) addresses; collect IP addresses accessed by the computing device during the predetermined time period; compare the IP addresses received by the computing device in the responses from the domain name server to the IP addresses accessed by the computing device; and detect domain name server tunneling based on the comparison.

20 Claims, 3 Drawing Sheets

(56) References Cited

U.S. PATENT DOCUMENTS

| | | |
|---|---|---|
| 2016/0050224 A1 | 2/2016 | Ricafort et al. |
| 2016/0065611 A1 | 3/2016 | Fakeri-tabrizi et al. |
| 2016/0099852 A1 | 4/2016 | Cook et al. |
| 2016/0127395 A1 | 5/2016 | Underwood et al. |
| 2016/0255012 A1 | 9/2016 | Mizrachi et al. |
| 2016/0294773 A1 | 10/2016 | Yu et al. |
| 2018/0167405 A1* | 6/2018 | Comay ............... H04L 63/1425 |

OTHER PUBLICATIONS

Binsalleeh, et al., "Characterization of Covert Channels in DNS", In Proceedings of the 6th International Conference on New Technologies, Mobility and Security, Mar. 30, 2014, 5 Pages.

Ichise, et al., "Analysis of Via-Resolver DNS TXT Queries and Detection Possibility of Botnet Communication", In Proceedings of the IEEE Pacific Rim Conference on Communications, Computers and Signal Processing, Aug. 24, 2015, pp. 216-221.

"International Search Report and Written Opinion Issued in PCT Application No. PCT/US18/022282", dated Jun. 6, 2018, 13 Pages.

Wang, Zheng, "Combating Malicious DNS Tunnel", In Journal of National Institute of Standards and Technology, May 4, 2016, 3 Pages.

Jin, et al., "Design of detecting botnet communication by monitoring direct outbound DNS queries", In Proceedings of the IEEE 2nd International Conference on Cyber Security and Cloud Computing (CSCloud), Nov. 3, 2015, pp. 37-41.

Zeltser, Lenny, "Tunneling Data and Commands over DNS to Bypass Firewalls", http://web.archive.org/web/20150706210448/https:/zeltser.com/c2-dns-tunneling/, Published on: Jul. 6, 2015, 11 pages.

Rlangston, "DNS Data Exfiltration—How it works", https://community.infoblox.com/t5/Community-Blog/DNS-Data-Exfiltration-How-it-works/ba-p/3664, Published on: Sep. 22, 2015, 9 pages.

Ellens, et al., "Flow-Based Detection of DNS Tunnels", In Proceedings of 7th IFIP WG 6.6 International Conference on Autonomous Infrastructure, Management, and Security, Jun. 25, 2013, pp. 124-135.

Rono, Derrick, "DNS Tunneling", https://www.researchgate.net/profile/Derrick_Rono/publication/277010994_DNS_Tunnelling/links/555e159c08ae8cOcab2c5fc3.pdf, Published on: May 2015, 9 pages.

Farnham, Greg, "Detecting DNS Tunneling", In White Paper of SANS Institute, Jun. 2012, pp. 1-32.

Revelli, et al., "Introducing Heyoka: DNS Tunneling 2.0", In Proceedings of Confidence, 2009, pp. 1-63.

* cited by examiner

DETECTING DOMAIN NAME SYSTEM (DNS) TUNNELING BASED ON DNS LOGS AND NETWORK DATA

FIELD

The present disclosure relates generally to network communications and more particularly to detecting Domain Name System (DNS) tunneling based on DNS logs and network data.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Domain Name System (DNS) is a protocol and service used on the Internet. DNS is commonly used to map domain names to Internet Protocol (IP) addresses. When users enter a domain name (e.g., example.com) in a web browser, DNS is used to perform a forward lookup to find one or more IP addresses for that domain name.

DNS is a hierarchical system. Each level in the hierarchy can be provided by another server with different ownership. For the Internet, there are 13 root DNS servers labeled A thru M. These root DNS servers are implemented by many more than 13 physical servers. The hierarchical nature of DNS can be explained using an example. Consider an example request for an IP address of a domain named my.test.example.com. A new request will first go to the root DNS servers to find which DNS server controls the .com top level domain. The .com DNS server will provide the DNS server that controls example.com domain. Next, the example.com DNS server will provide the DNS server that controls the test.example.com domain. Finally, the test.example.com DNS server will provide the IP address for my.test.example.com.

With the hierarchical system, a given domain owner can define authoritative servers for its domain. That is, the user is in control of the ultimate destination host for DNS queries for its domain. In a typical enterprise, endpoints do not make DNS requests directly to the Internet. Internal DNS servers provide DNS services to an endpoint. However, since DNS will forward requests until the authoritative name server is contacted, an attacker with access on an internal endpoint can leverage the DNS infrastructure of the enterprise for DNS tunneling to a domain that the attacker controls.

DNS tunneling is a method of embedding data in DNS queries and responses between a compromised client and a malicious DNS server, which allows for data exfiltration and botnet command and control (explained below). With DNS tunneling, another protocol can be tunneled through DNS. A DNS tunnel can be used for command and control, data exfiltration, and/or tunneling of any IP traffic. DNS tunnels allow circumventing access and security policies in firewalled networks. Such a security breach can be misused for activities like free web browsing, command and control traffic, and/or cyber espionage.

DNS tunneling is possible because DNS requests are generally not filtered at the firewall, effectively opening a security breach. The fact that information bypasses a first line of network security mechanism makes DNS tunneling very attractive in contexts other than free web browsing. Some examples include command and control and data exfiltration in cyber-espionage attacks, where an attacker needs an available but inconspicuous communication channel, which DNS provides.

DNS tunneling works by encapsulating data into DNS packets. Typically, a tunnel client (i.e., a compromised client) encapsulates data to be sent in a query for a specific domain name. A DNS resolver treats the tunnel traffic as a regular request by starting a lookup process for the requested domain name, possibly recursively consulting other DNS resolvers. At the end of this operation, the request is processed by a tunnel server (i.e., a malicious DNS server). The tunnel server retrieves the encapsulated data and responds to DNS queries by enclosing tunnel data (i.e., malicious IP addresses and/or data) in the answer section of the DNS response message.

The DNS protocol is also used in botnet communications between bot-infected computers and command and control (C&C) servers. A "bot" is a type of malware that allows an attacker to take control over an affected computer. A botnet (the term "botnet" is formed from the words "robot" and "network") is a network of computers, infected with malicious software (malware) and controlled by cybercriminals without the knowledge of the owners of the computers, set up to forward transmissions (including spam or viruses) to other computers on the Internet. Since DNS protocol is used for most Internet services, it is difficult to simply block DNS traffic based on the possibility of usage of DNS protocol in botnet communications, which is why attackers use DNS protocol in botnet communications.

SUMMARY

A system comprises a processor and machine readable instructions stored on a tangible machine readable medium, which when executed by the processor, configure the processor to collect, during a predetermined time period, responses received from a domain name server to queries sent to the domain name server by a computing device, the responses including internet protocol (IP) addresses; collect IP addresses accessed by the computing device during the predetermined time period; compare the IP addresses received by the computing device in the responses from the domain name server to the IP addresses accessed by the computing device; and detect domain name server tunneling based on the comparison.

In other features, the machine readable instructions further configure the processor to detect the domain server tunneling when a correlation between the IP addresses received by the computing device in the responses from the domain name server and the IP addresses accessed by the computing device is less than or equal to a predetermined threshold.

In other features, the machine readable instructions further configure the processor to detect the domain server tunneling when a discrepancy between the IP addresses accessed by the computing device and the IP addresses received by the computing device in the responses from the domain name server is greater than or equal to a predetermined threshold.

In other features, the machine readable instructions further configure the processor to detect the domain server tunneling when a number of the IP addresses accessed by the computing device is less than or equal to a predetermined percentage of a number of the IP addresses received by the computing device in the responses from the domain name server.

In other features, the machine readable instructions further configure the processor to generate an indication indicating that the domain name server is malicious when the domain name server tunneling is detected based on the comparison.

In other features, the machine readable instructions further configure the processor to generate an indication indicating that a security of data on the computing device is compromised when the domain name server tunneling is detected based on the comparison.

In other features, the machine readable instructions further configure the processor to generate an indication when a discrepancy between the IP addresses received by the computing device in the responses from the domain name server and the IP addresses accessed by the computing device is greater than or equal to a predetermined threshold.

In other features, the machine readable instructions further configure the processor to indicate occurrence of the domain name server tunneling with a predetermined confidence level when a discrepancy between the IP addresses received by the computing device in the responses from the domain name server and the IP addresses accessed by the computing device is greater than or equal to a predetermined threshold and when another condition associated with communications of one or more of the computing device and the domain name server is detected.

In other features, the other condition includes a query with a domain name greater than or equal to a predetermined length sent from the computing device.

In still other features, a method for detecting domain name server tunneling between a computing device and a domain name server, comprises collecting, during a predetermined time period, responses received from a domain name server to queries sent to the domain name server by a computing device, the responses including internet protocol (IP) addresses; monitoring communication between the computing device and devices other than the domain name server; collecting, based on the monitoring, IP addresses accessed by the computing device during the predetermined time period; comparing the IP addresses received by the computing device in the responses from the domain name server to the IP addresses accessed by the computing device; and detecting domain name server tunneling based on the comparison.

In other features, the method further comprises determining that the domain server tunneling exists when a correlation between the IP addresses received by the computing device in the responses from the domain name server and the IP addresses accessed by the computing device is less than or equal to a predetermined threshold.

In other features, the method further comprises determining that the domain server tunneling exists when a discrepancy between the IP addresses accessed by the computing device and the IP addresses received by the computing device in the responses from the domain name server is greater than or equal to a predetermined threshold.

In other features, the method further comprises determining that the domain server tunneling exists when a number of the IP addresses accessed by the computing device is less than or equal to a predetermined percentage of a number of the IP addresses received by the computing device in the responses from the domain name server.

In other features, the method further comprises generating an indication indicating that the domain name server is malicious when the domain name server tunneling is detected based on the comparison.

In other features, the method further comprises generating an indication indicating that a security of data on the computing device is compromised when the domain name server tunneling is detected based on the comparison.

In other features, the method further comprises generating an indication when greater than or equal to a predetermined number of the IP addresses received by the computing device in the responses from the domain name server are not accessed by the computing device.

In other features, the method further comprises indicating occurrence of the domain name server tunneling with a predetermined confidence level when a discrepancy between the IP addresses received by the computing device in the responses from the domain name server and the IP addresses accessed by the computing device is greater than or equal to a predetermined threshold and when another condition associated with communications of one or more of the computing device and the domain name server is detected.

In other features, the other condition includes a query with a domain name greater than or equal to a predetermined length sent from the computing device.

In still other features, a system for detecting domain name server tunneling between a computing device and a domain name server, comprises a processor; and machine readable instructions stored on a tangible machine readable medium, which when executed by the processor, configure the processor to collect, during a predetermined time period, responses received by the computing device from the domain name server to queries sent by the computing device to the domain name server, the responses including a first set of internet protocol (IP) addresses; monitor communication of the computing device with devices other than the domain name server; collect, based on the monitoring, a second set of IP addresses accessed by the computing device during the predetermined time period; compare the second set of IP addresses to the first set of IP addresses; and detect the domain name server tunneling based on the comparison.

In other features, the machine readable instructions further configure the processor to detect the domain server tunneling when the second set of IP addresses includes less than or equal to a predetermined number of the first set of IP addresses.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 2:
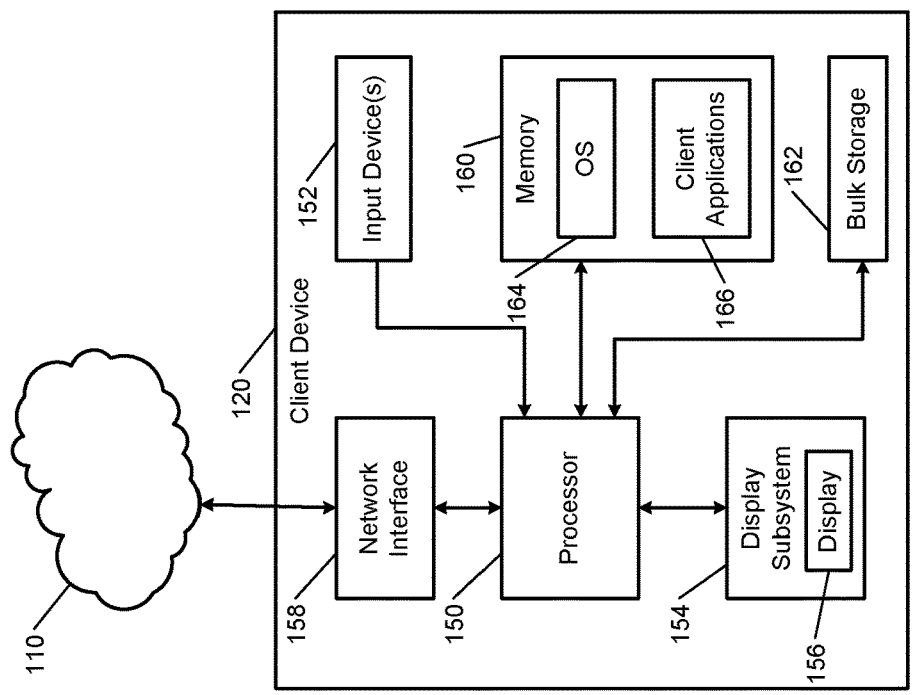
FIG. 2 is a functional block diagram of a simplified example of a client device used in the distributed network system of FIG. 1 that can employ methods to detect Domain Name System (DNS) tunneling according to the present disclosure.

The present disclosure relates to system and methods for detecting Domain Name System (DNS) tunneling based on comparison of DNS communication and other network communication of a client (e.g., a computing device). The method utilizes DNS query logs and network communication data of the client to find correlation between the IP addresses that appear in DNS responses received by the client and the IP addresses that are actually accessed by the client. The method detects DNS tunneling when domain name servers exhibit abnormal behavior, in the sense that their responses seldom lead clients to access domains/IPs the domain name servers return.

Some methods for detecting DNS tunneling focus on DNS queries and responses and do not inspect the connection between IP addresses that appear in the DNS responses received by a client and the IP addresses that appear in the overall network communication of the client. In contrast, the method according to the present disclosure keeps track of the IP addresses that appear in the DNS responses received by a client and the IP addresses that appear in the overall network communication of the client for the purpose of detecting DNS tunneling. In DNS tunneling, a name server is not used to resolve domains to IP addresses but rather to ex-filtrate data from compromised computers.

To implement the method according to the present disclosure, two datasets are used. A first dataset includes DNS logs that contain DNS responses received by a client from authoritative domain name servers. A second dataset includes network communication data of the client that includes for each packet sent or received by the client: source and destination IP addresses, and time a packet was sent and/or received. Accordingly, the method is simple and easy to implement.

Specifically, in a predefined time interval (e.g., one hour or one day), for each name server, all the IP addresses that were returned to a client computer in a response from a name server (or in a response from a different name server that resulted from a CNAME query to the original name server) are collected. These IP addresses may be called DNS IP addresses. Each name server has its set of DNS IP addresses in the specified time interval. In addition, all the IP addresses that were accessed from the client computer in the specified time interval are collected. These IP addresses may be called accessed IP addresses. Then the number of responses from each name server that eventually led to an IP address being accessed by the client is counted. When the name servers exhibit abnormal behavior in the sense that there is a large discrepancy between the set of DNS IP addresses and the set of accessed IP addresses, an alert indicating existence of a DNS tunnel is triggered.

The method can be combined with other detection models or can be used as a feature for machine-learning based DNS tunneling detection engine. For example, the method can be used to train classifiers that use features that are based on the comparison of the DNS IP addresses and the accessed IP addresses. Deterministic rules can also be created based on the comparison of the DNS IP addresses and the accessed IP addresses. For example, a deterministic rule can be set as follows: if there are more than X IP addresses that were returned from DNS responses but were not used afterwards for communication, then trigger an alert indicating existence of DNS tunneling. The rule can also be added as a feature to train a classifier that will use other features as well. For example, a trained model can learn that if there is a large discrepancy between the DNS IP addresses and the accessed IP addresses, and also a query that has a long domain name, then with high confidence a DNS tunneling has occurred. Consequently, the model will trigger an alert indicating existence of DNS tunneling.

The method for detecting DNS tunneling according to the present disclosure is described below in detail. Following are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 1:
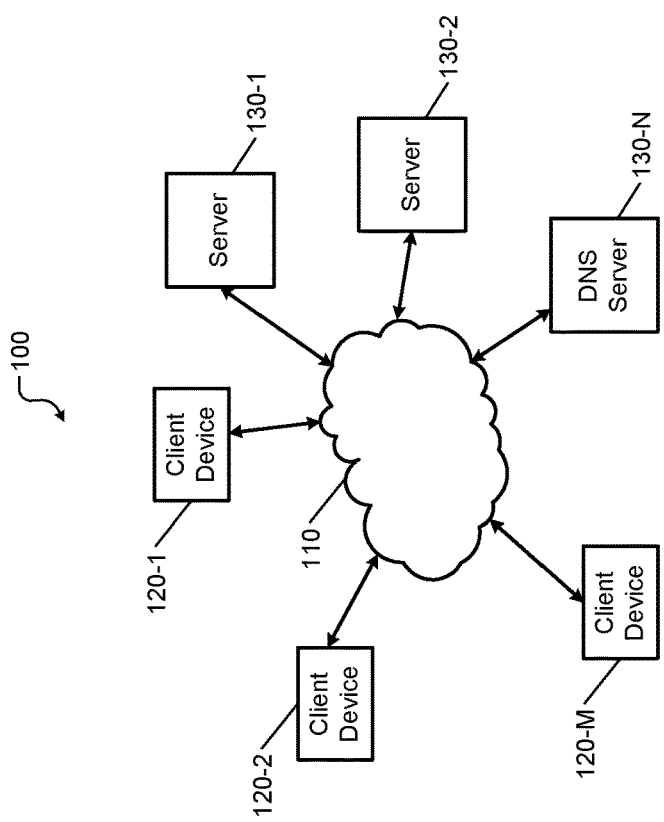
FIG. 1 is a functional block diagram of a simplified example of a distributed network system.

FIG. 1 shows a simplified example of a distributed network system 100. The distributed network system 100 includes a network 110, one or more client devices 120-1, 120-2, . . . , and 120-M (collectively client devices 120) (where M is an integer greater than or equal to 1), and a plurality of servers 130-1, 130-2, . . . , and 130-N (collectively servers 130) (where N is an integer greater than or equal to 1).

The network 110 may include a local area network (LAN), a wide area network (WAN) such as the Internet, or other type of network (collectively shown as the network 110). The client devices 120 communicate with the servers 130 via the network 110. The client devices 120 and the servers 130 may connect to the network 110 using wireless and/or wired connections to the network 110.

For example, the client devices 120 may include computing devices such as smartphones, personal digital assistants (PDAs), laptop computers, personal computers (PCs), and so on. The servers 130 may provide multiple services to the client devices 120. The servers 130 may host multiple databases that are utilized by the plurality of software applications and that are used by users of the client devices 120.

At least one of the servers 130 (e.g., server 130-N) is a DNS server with which one of the client device 120 (e.g., client device 120-1) communicates. While only one DNS server is shown, the distributed network system 100 may include multiple DNS servers. One or more of the other servers 130-1, 130-2, and so on may belong to different enterprises. The client device 120-1 may communicate with the servers 130-1, 130-2, and so on.

In use (i.e., during normal operation without existence of a DNS tunnel between the DNS server 130-N and the client device 120-1), the client device 120-1 may communicate with at least one of servers 130 (e.g., server 130-1) as follows. The client device 120-1 sends a DNS query to the DNS server 130-N and receives an IP address for the server 130-1 in a DNS response received from the DNS server 130-N. Then the client device 120-1 accesses the server 130-1 using the IP address for the server 130-1 received in the DNS response from the DNS server 130-N. The client device 120-1 may also communicate with other servers 130-2, 130-3, and so on based on IP addresses for the other servers received in DNS responses from the DNS server 130-N. The communication between the client device 120-1 and the servers 130 when a DNS tunnel exists between the DNS server 130-N and the client device 120-1 is described below with reference to FIGS. 4 and 5.

FIG. 2 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more applications executed by the server 130 via the network 110. Additionally, the client applications 166 include an application that implements the method for detecting tunneling according to the present disclosure (e.g., see methods 200 and 250 described below with reference to FIGS. 4 and 5).

Figure 3:
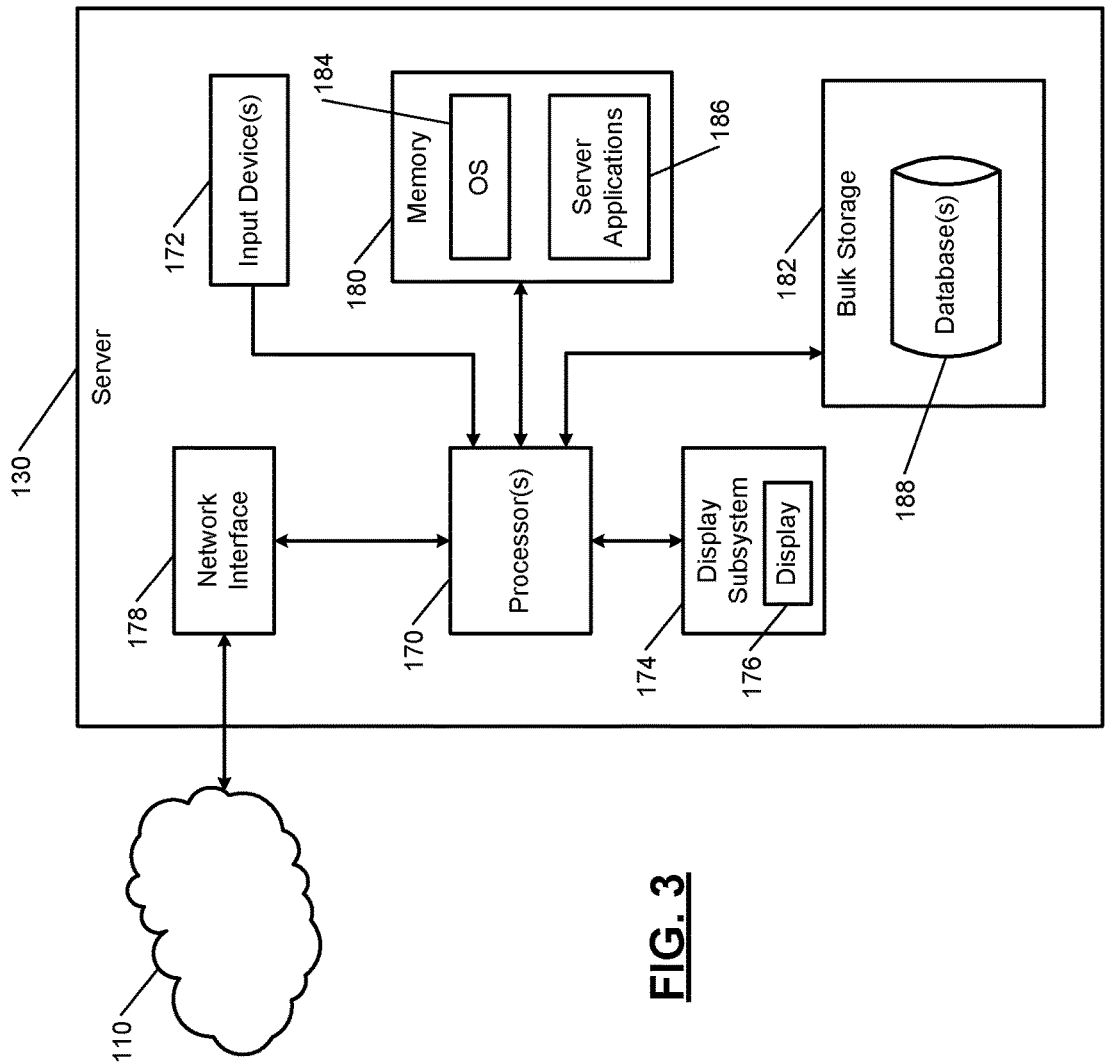
FIG. 3 is a functional block diagram of a simplified example of a server used in the distributed network system of FIG. 1.

FIG. 3 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186. The bulk storage 182 may store one or more databases 188 that store data structures used by the server applications 186 to perform respective functions.

Figure 5:
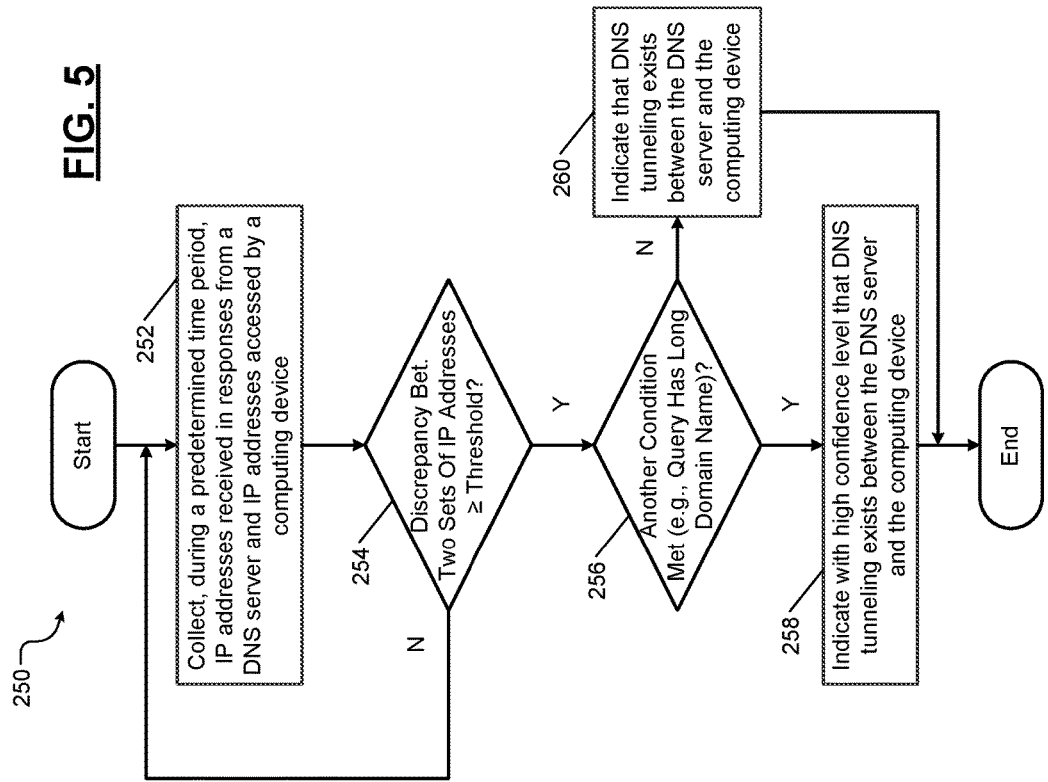
FIG. 5 is a flowchart of a method for training a classifier for detecting DNS tunneling with high confidence according to the present disclosure.
Figure 4:
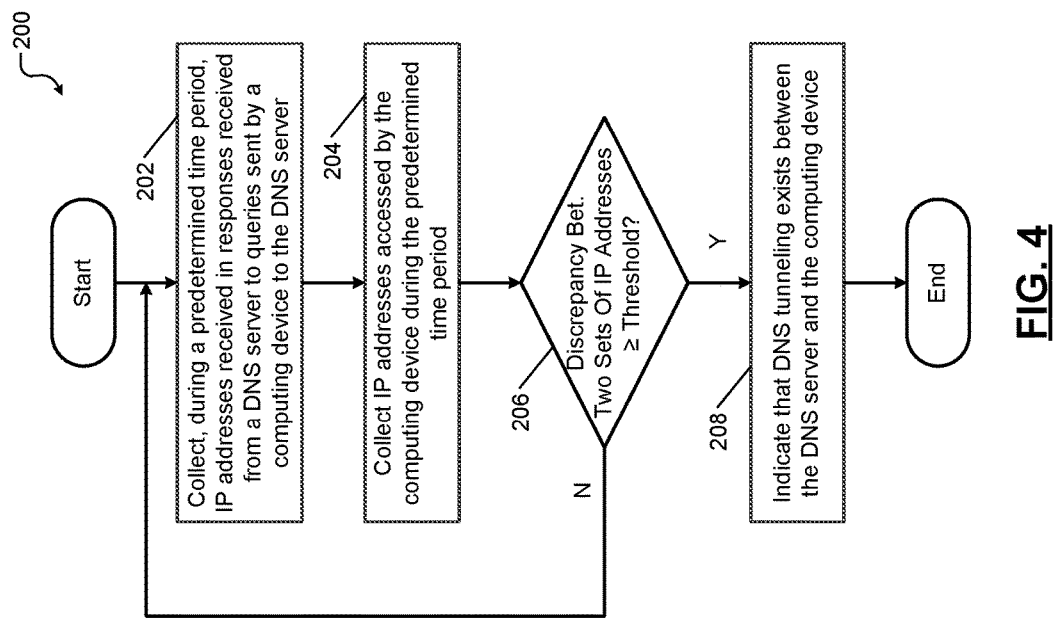
FIG. 4 is a flowchart of a method for detecting DNS tunneling based on DNS logs and network data according to the present disclosure.

FIGS. 4 and 5 show methods for detecting DNS tunneling executed by one or more client devices 120 (e.g., the client device 120-1) that is compromised (i.e., infected by malware) and is suspected of being a victim of DNS tunneling. For example, a DNS tunnel may exist between the client device 120-1 and the DNS server 130-N. The methods describe below explain how the DNS tunneling between the client device 120-1 and the DNS server 130-N is detected according to the present disclosure.

In the description of the methods below, the term control refers to one or more of the client applications 166 described above with reference to FIGS. 1 and 2. In other words, the term control as used in the description of the methods below represents code or instructions executed by one or more components of the client device 120 shown in FIGS. 1 and 2 to perform the described functionality.

FIG. 4 shows a method 200 for detecting DNS tunneling according to the present disclosure. The method 200 is executed by a computing device (e.g., the client device 120-1) suspected of being a victim of DNS tunneling. For example, the method 200 may be one of the client applications 166 running on the client device 120-1. At 202, for a predetermined period of time, control collects IP addresses received in responses received from a DNS server to queries sent by a computing device to the DNS server. For example, the client device 120-1 may send DNS queries to the DNS server 130-N, and in response to the DNS queries, the DNS server 130-N may send DNS responses to the client device 120-1. The DNS responses received from the DNS server 130-N may include IP addresses (called the DNS IP addresses) that the client device 120-1 may use for subsequent communications.

If the client device 120-1 is not infected or compromised, and if the DNS server 130-N is not a malicious DNS server, there is no DNS tunneling between the client device 120-1 and the DNS server 130-N. The DNS query sent by the client device 120-1 to the DNS server 130-N may include a domain name that the client device 120-1 wants to access. In response to the query, the DNS response sent by the DNS server 130-N to the client device 120-1 may include an IP address for the domain name that the client 120-1 wants to access. After receiving the DNS response, the client device 120-1 may use the IP address received in the DNS response to access a server having the domain name and the IP address (e.g., server 130-1).

If, however, the client device 120-1 is infected or compromised, and if the DNS server 130-N is a malicious DNS server, unknown to the owner of the client device 120-1, a DNS tunnel is formed between the client device 120-1 and the DNS server 130-N. Without the knowledge of the owner of the client device 120-1, the DNS queries and the DNS responses exchanged between the client device 120-1 and the DNS server 130-N will include malicious domain names (in the DNS queries), malicious IP addresses (in the DNS responses), and malicious data (in both the DNS queries and the DNS responses). Without the knowledge of the owner of the client device 120-1, the client device 120-1 will communicate with a malicious command and control (C&C) server (e.g., server 130-2), which will ex-filtrate additional sensitive data from the client device 120-1, in addition to the data unknowingly sent from the client device 120-1 to the DNS server 130-N in the DNS query. The client device 120-1 will not use the IP addresses received in the DNS responses to communicate with the desired domain names and servers. Instead, the client device 120-1 will communicate with the C&C server based on the malicious content (IP addresses and/or data) received in the DNS response by the client device 120-1 from the DNS server 130-N.

At 204, during the predetermined time period, control collects all the IP addresses accessed by the computing device. For example, control collects the IP addresses accessed by the client device 120-1, which is suspected of being compromised, and which is suspected of communicating with the DNS server 130-N via a DNS tunnel. If the client device 120-1 is compromised and is communicating with the DNS server 130-N via a DNS tunnel, there will be a significant and noticeable disparity between the number of IP addresses received by the client device 120-1 in the DNS responses received from the DNS server 130-N (i.e., the DNS IP addresses) and the number of IP addresses accessed by the client device 120-1 (i.e., the accessed IP addresses). Control counts the number of DNS responses that eventually led to an IP address being accessed by the client device

120-1. In other words, control keeps track of the IP addresses that appear in the DNS responses received by the client device 120-1 and the IP addresses that appear in the overall network communication performed by the client device 120-1. Control correlates the two sets of IP addresses to determine whether a significant disparity exists between the two sets of IP addresses.

At 206, control determines if there is a discrepancy between the DNS IP addresses and the accessed IP addresses. For example, control determines if the discrepancy between the two sets of IP addresses is greater than or equal to a predetermined threshold. In other words, control determines if there are more than a predetermined number of IP addresses that were returned from the DNS responses to the client device 120-1 but were not used afterwards for communication by the client device 120-1. If there is no discrepancy, then there is no DNS tunneling, and control returns to 202. If, however, there is a discrepancy, then at 208, control determines that a DNS tunnel exists between the client device 120-1 and the DNS server 130-N, and control triggers an alert indicating that a DNS tunnel exists between the client device 120-1 and the DNS server 130-N.

FIG. 5 shows a method 250 for training a classifier to detect DNS tunneling according to the present disclosure. For example, in the method 250, a deterministic rule can be set as follows: if there are more than X (a predetermined number) IP addresses that were returned to a computing device from DNS responses but were not used afterwards for communication by the computing device, then trigger an alert. Such a rule can also be added as a feature to train a classifier that will be based on other features as well. For example, in the method 250, a trained model can learn that if there is a large discrepancy between the IP addresses in the DNS responses and the IP addresses in the overall communication of the computing device, and also if there is a large a query that has a long domain name, which may be a suspect, then with high confidence a DNS tunneling has occurred. Consequently, the model will trigger an alert. Instead of a long domain name, any other feature or criteria may be used in combination with the large discrepancy to conclude with high confidence that a DNS tunneling has occurred.

The method 250 is described below. The method 250 is executed by a computing device (e.g., the client device 120-1) suspected of being a victim of DNS tunneling. For example, the method 250 may be one of the client applications 166 running on the client device 120-1.

At 252, for a predetermined period of time, control collects the IP addresses received in the DNS responses received by computing device (e.g., the client device 120-1) from a DNS server (e.g., the DNS server 130-N). During the predetermined period of time, control also collects all the IP addresses appearing in overall network communication performed by the computing device.

At 254, control uses a deterministic rule as to whether a discrepancy between the two sets of IP addresses collected during the predetermined period of time is greater than or equal to a predetermined threshold. Control returns to 252 if there is no discrepancy. If, however, there is a discrepancy, at 256, control determines whether an additional condition or criterion used by a classifier to detect and indicate suspicious network activity is also satisfied. For example, control may determine whether a query originating from the computing device has an unusually long domain name, which may be an indicium of suspicious network activity. Any other criteria may be used instead in conjunction with the discrepancy observation.

At 258, if the additional condition is also satisfied in addition to the observed discrepancy, control indicates with high confidence level that DNS tunneling exists between the computing device and the DNS server. At 260, if the additional condition is not satisfied, control still indicates that DNS tunneling exists between the computing device and the DNS server. Accordingly, the classifier using the additional condition or conditions to detect and indicate suspicious network activity may be further trained using the deterministic rule and the discrepancy detected based on the deterministic rule to indicate with high confidence that a DNS tunnel exists between the computing device and the DNS server.

In both methods 200 and 250, after detecting DNS tunneling, a cyber-attack investigation is performed, including, for example, inspection of network activity and operating system logs to confirm that an attack in fact occurred, upon which the malicious domain name and name server can be blocked in the firewalls/DNS server.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a processor; and
    machine readable instructions, stored on a tangible machine readable medium, when executed by the processor, configure the processor to:
        collect, during a predetermined time period, responses received from a domain name server to queries sent to the domain name server by a computing device, the responses including internet protocol (IP) addresses;
        collect IP addresses accessed by the computing device during the predetermined time period;
        compare the IP addresses received by the computing device in the responses from the domain name server to the IP addresses accessed by the computing device;
        detect domain name server tunneling based on the comparison; and
        in response to detecting the domain name server tunneling based on the comparison, trigger an alert indicating existence of the domain name server tunneling.

2. The system of claim 1 wherein the machine readable instructions further configure the processor to detect the domain server tunneling when a correlation between the IP addresses received by the computing device in the responses from the domain name server and the IP addresses accessed by the computing device is less than or equal to a predetermined threshold.

3. The system of claim 1 wherein the machine readable instructions further configure the processor to detect the domain server tunneling when a discrepancy between the IP addresses accessed by the computing device and the IP addresses received by the computing device in the responses from the domain name server is greater than or equal to a predetermined threshold.

4. The system of claim 1 wherein the machine readable instructions further configure the processor to detect the domain server tunneling when a number of the IP addresses accessed by the computing device is less than or equal to a predetermined percentage of a number of the IP addresses received by the computing device in the responses from the domain name server.

5. The system of claim 1 wherein the machine readable instructions further configure the processor to generate an indication indicating that the domain name server is malicious when the domain name server tunneling is detected based on the comparison.

6. The system of claim 1 wherein the machine readable instructions further configure the processor to generate an indication indicating that a security of data on the computing device is compromised when the domain name server tunneling is detected based on the comparison.

7. The system of claim 1 wherein the machine readable instructions further configure the processor to generate an indication when a discrepancy between the IP addresses received by the computing device in the responses from the domain name server and the IP addresses accessed by the computing device is greater than or equal to a predetermined threshold.

8. The system of claim 1 wherein the machine readable instructions further configure the processor to indicate occurrence of the domain name server tunneling with a predetermined confidence level when a discrepancy between the IP addresses received by the computing device in the responses from the domain name server and the IP addresses accessed by the computing device is greater than or equal to a predetermined threshold and when another condition associated with communications of one or more of the computing device and the domain name server is detected.

9. The system of claim 8 wherein the other condition includes a query with a domain name greater than or equal to a predetermined length sent from the computing device.

10. A method for detecting domain name server tunneling between a computing device and a domain name server, the method comprising:
collecting, during a predetermined time period, responses received from a domain name server to queries sent to the domain name server by a computing device, the responses including internet protocol (IP) addresses;
monitoring communication between the computing device and devices other than the domain name server;
collecting, based on the monitoring, IP addresses accessed by the computing device during the predetermined time period;
comparing the IP addresses received by the computing device in the responses from the domain name server to the IP addresses accessed by the computing device;
detecting domain name server tunneling based on the comparison; and
in response to detecting the domain name server tunneling based on the comparison, triggering an alert indicating existence of the domain name server tunneling.

11. The method of claim 10 further comprising determining that the domain server tunneling exists when a correlation between the IP addresses received by the computing device in the responses from the domain name server and the IP addresses accessed by the computing device is less than or equal to a predetermined threshold.

12. The method of claim 10 further comprising determining that the domain server tunneling exists when a discrepancy between the IP addresses accessed by the computing device and the IP addresses received by the computing device in the responses from the domain name server is greater than or equal to a predetermined threshold.

13. The method of claim 10 further comprising determining that the domain server tunneling exists when a number of the IP addresses accessed by the computing device is less than or equal to a predetermined percentage of a number of the IP addresses received by the computing device in the responses from the domain name server.

14. The method of claim 10 further comprising generating an indication indicating that the domain name server is malicious when the domain name server tunneling is detected based on the comparison.

15. The method of claim 10 further comprising generating an indication indicating that a security of data on the computing device is compromised when the domain name server tunneling is detected based on the comparison.

16. The method of claim 10 further comprising generating an indication when greater than or equal to a predetermined number of the IP addresses received by the computing device in the responses from the domain name server are not accessed by the computing device.

17. The method of claim 10 further comprising indicating occurrence of the domain name server tunneling with a predetermined confidence level when a discrepancy between the IP addresses received by the computing device in the responses from the domain name server and the IP addresses accessed by the computing device is greater than or equal to a predetermined threshold and when another condition associated with communications of one or more of the computing device and the domain name server is detected.

18. The method of claim 17 wherein the other condition includes a query with a domain name greater than or equal to a predetermined length sent from the computing device.

19. A system for detecting domain name server tunneling between a computing device and a domain name server, the system comprising:
a processor; and
machine readable instructions, stored on a tangible machine readable medium, when executed by the processor, configure the processor to:
collect, during a predetermined time period, responses received by the computing device from the domain name server to queries sent by the computing device to the domain name server, the responses including a first set of internet protocol (IP) addresses;
monitor communication of the computing device with devices other than the domain name server;
collect, based on the monitoring, a second set of IP addresses accessed by the computing device during the predetermined time period;
compare the second set of IP addresses to the first set of IP addresses;
detect the domain name server tunneling based on the comparison; and
in response to detecting the domain name server tunneling based on the comparison, trigger an alert indicating existence of the domain name server tunneling.

20. The system of claim 19 wherein the machine readable instructions further configure the processor to detect the domain server tunneling when the second set of IP addresses includes less than or equal to a predetermined number of the first set of IP addresses.

* * * * *